US008287242B2

(12) United States Patent
Bifulco

(10) Patent No.: US 8,287,242 B2
(45) Date of Patent: Oct. 16, 2012

(54) TURBINE ENGINE ROTOR HUB

(75) Inventor: Anthony R. Bifulco, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 872 days.

(21) Appl. No.: 12/272,269

(22) Filed: Nov. 17, 2008

(65) Prior Publication Data

US 2010/0124495 A1 May 20, 2010

(51) Int. Cl.
*B64C 11/14* (2006.01)

(52) U.S. Cl. ................................ 416/244 A; 415/216.1

(58) Field of Classification Search .............. 416/198 A, 416/201 R, 244 A; 415/216.1
See application file for complete search history.

(56) References Cited

U.S. PATENT DOCUMENTS

| | | | | |
|---|---|---|---|---|
| 3,483,696 | A * | 12/1969 | Gilbert et al. | 60/792 |
| 3,765,795 | A * | 10/1973 | Koff | 416/198 R |
| 5,275,534 | A * | 1/1994 | Cameron et al. | 416/95 |
| 7,059,831 | B2 | 6/2006 | Suciu et al. | |
| 7,147,436 | B2 * | 12/2006 | Suciu et al. | 415/216.1 |
| 7,186,079 | B2 | 3/2007 | Suciu et al. | |
| 7,309,210 | B2 | 12/2007 | Suciu et al. | |
| 7,322,101 | B2 | 1/2008 | Suciu et al. | |
| 2006/0130488 | A1 | 6/2006 | Suciu et al. | |
| 2007/0107219 | A1 | 5/2007 | Suciu et al. | |
| 2007/0297897 | A1 * | 12/2007 | Tran et al. | 415/170.1 |

* cited by examiner

*Primary Examiner* — Fernando L Toledo
*Assistant Examiner* — Bryan Junge
(74) *Attorney, Agent, or Firm* — Bachman & LaPointe, P.C.

(57) ABSTRACT

A rotor has a central shaft having a central longitudinal axis. The rotor has a longitudinal stack of a plurality of disks surrounding the shaft. An aft hub couples the stack to the shaft. The aft hub has a proximal portion and a distal portion. The distal portion tapers at a lower characteristic half angle than does the proximal portion.

27 Claims, 8 Drawing Sheets

TURBINE ENGINE ROTOR HUB

BACKGROUND

The disclosure relates to gas turbine engines. More particularly, the disclosure relates to gas turbine engine rotor stacks.

A gas turbine engine typically includes one or more rotor stacks associated with one or more sections of the engine. A rotor stack may include several longitudinally spaced apart blade-carrying disks of successive stages of the section. A stator structure may include circumferential stages of vanes longitudinally interspersed with the rotor disks. The rotor disks are secured to each other against relative rotation and the rotor stack is secured against rotation relative to other components on its common spool (e.g., the low and high speed/pressure spools of the engine).

Numerous systems have been used to tie rotor disks together. In an exemplary center-tie system, the disks are held longitudinally spaced from each other by sleeve-like spacers. The spacers may be unitarily-formed with one or both adjacent disks. However, some spacers are often separate from at least one of the adjacent pair of disks and may engage that disk via an interference fit and/or a keying arrangement. The interference fit or keying arrangement may require the maintenance of a longitudinal compressive force across the disk stack so as to maintain the engagement. The compressive force may be obtained by securing opposite ends of the stack to a central shaft passing within the stack. The stack may be mounted to the shaft with a longitudinal precompression force so that a tensile force of equal magnitude is transmitted through the portion of the shaft within the stack.

Alternate configurations involve the use of an array of circumferentially-spaced tie rods extending through web portions of the rotor disks to tie the disks together. In such systems, the associated spool may lack a shaft portion passing within the rotor. Rather, separate shaft segments may extend longitudinally outward from one or both ends of the rotor stack.

Desired improvements in efficiency and output have greatly driven developments in turbine engine configurations. Efficiency may include both performance efficiency and manufacturing efficiency.

U.S. patent publications 20050232773A1, 20050232774A1, 20060099070A1, 20060130456A1, and 20060130488A1 of Suciu and Norris (hereafter collectively the Suciu et al. applications, the disclosures of which are incorporated by reference herein as if set forth at length) disclose engines having one or more outwardly concave inter-disk spacers. With the rotor rotating, a centrifugal action may maintain longitudinal rotor compression and engagement between a spacer and at least one of the adjacent disks. This engagement may transmit longitudinal torque between the disks in addition to the compression.

SUMMARY

One aspect of the disclosure involves a gas turbine engine rotor. The rotor has a central shaft having a central longitudinal axis. The rotor has a longitudinal stack of a plurality of disks surrounding the shaft. An aft hub couples the stack to the shaft. The aft hub has a proximal portion and a distal portion. The distal portion tapers at a lower characteristic half angle than does the proximal portion.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
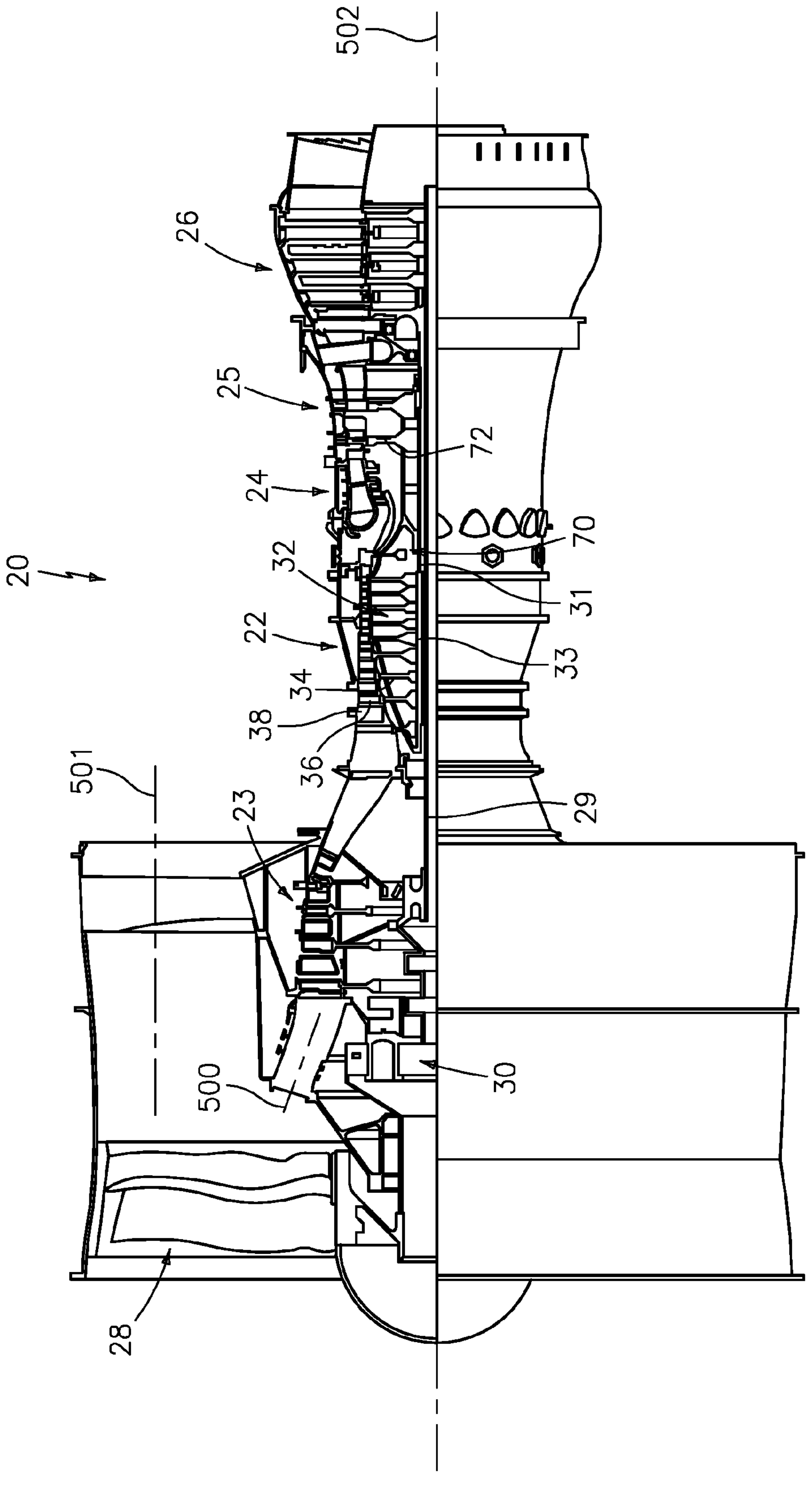
FIG. 1 is a partial longitudinal sectional view of a gas turbine engine.

FIG. 1 shows a gas turbine engine 20. The exemplary engine 20 is a two-spool engine having a high speed/pressure compressor (HPC) section 22 receiving air moving along a core flowpath 500 from a low speed/pressure compressor (LPC) section 23 and delivering the air to a combustor section 24. High and low speed/pressure turbine (HPT, LPT) sections 25 and 26 are downstream of the combustor along the core flowpath 500. The exemplary engine further includes a fan 28 driving air along a bypass flowpath 501. Alternative engines might include an augmentor (not shown) among other systems or features.

The exemplary engine 20 includes low and high speed spools mounted for rotation about an engine central longitudinal axis or centerline 502 relative to an engine stationary structure via several bearing systems. The low speed shaft 29 carries LPC and LPT rotors and their blades to form the low speed spool. Alternative fans may be directly driven by one of the spools. The low speed shaft 29 may be an assembly, either fully or partially integrated (e.g., via welding). The exemplary low speed shaft is coupled to the fan 28 by an epicyclic transmission 30 to drive the fan at a lower speed than the low speed spool. The high speed spool similarly includes the HPC and HPT rotors and their blades and a high speed shaft 31.

FIG. 1 shows an HPC rotor stack 32 mounted to the high speed shaft 31 across a forward portion 33 thereof. The exemplary rotor stack 32 includes, from fore to aft and upstream to downstream, a plurality of blade disks 34 each carrying an associated stage of blades 36 (e.g., by engagement of dovetail blade roots (not shown) to complementary disk slots). A plurality of stages of vanes 38 are located along the core flowpath 500 sequentially interspersed with the blade stages. The vanes have airfoils extending radially inward from roots at outboard shrouds/platforms 39 (FIG. 2) formed as portions of a core flowpath outer wall 40. The vane airfoils extend inward to inboard tips 42. The tips face stack spacers 43 forming portions of a core flowpath inboard wall 44.

In the exemplary embodiment, each of the disks 34 has a generally annular web 50 extending radially outward from an inboard annular protuberance known as a "bore" 52 to an outboard peripheral portion 54 (e.g., bearing an array of blade attachment slots). The bores 52 encircle central apertures of the disks through which the portion 33 of the high speed shaft 31 freely passes with clearance. Alternative blades may be unitarily formed with the peripheral portions 54 (e.g., as a single piece with continuous microstructure (an integrally bladed rotor (IBR) or "blisk" machined from a single piece of raw material)) or non-unitarily integrally formed (e.g., via welding so as to only be destructively removable).

The outboard spacers 43 connect adjacent pairs of the disks 34. In the exemplary engine, some of the spacers 43 are formed separately from their adjacent disks. The spacers 43 may each have end portions in contacting engagement with adjacent portions (e.g., to peripheral portions 54) of the adjacent disks. Alternative spacers may be integrally formed with (e.g., unitarily formed with or welded to) one of the adjacent disks and extend to a contacting engagement with the other disk. For example, the spacer between the exemplary last two disks is shown unitarily formed with the last (aft/rear) disk.

The spacers may be outwardly concave (e.g., as disclosed in the Suciu et al. applications). The contacting engagement with the peripheral portions of the adjacent disks produces a longitudinal engagement force increasing with speed due to centrifugal action tending to straighten/flatten the spacers' sections.

In the exemplary engine, the high speed shaft 31 is used as a center tension tie to hold the rotor stack 32 in compression. The disks may be assembled to the shaft 31 from fore-to-aft (or aft-to-fore, depending upon configuration) and then compressing the stack and installing a locking nut or other element to hold the stack precompressed).

Tightness of the rotor stack at the disk outboard peripheries may be achieved in a number of ways. Outward concavity of the spacers may produce a speed-increasing longitudinal compression force along a secondary compression path through the spacers. Additionally, the static conditions of the fore and aft disks may be slightly dished respectively forwardly and aft. With rotation, centrifugal action will tend to straighten/undish the fore and aft disks and move their peripheral portions longitudinally inward (i.e., respectively aft and forward). This tendency may counter the effect on and from the spacers so as to at least partially resist their flattening. The engine operational condition affects the distribution of forces and torques along the length of the rotor stack. For example, in a compressor stack driven by a downstream turbine, the operationally-induced longitudinal torque increases from upstream to downstream. Similarly, the compression provides a downstream-increasing longitudinal tension partially counteracting the precompression and any speed-increasing longitudinal compression associated with the spacers or other rotor geometry. Similarly, any rub between the blade tips and the engine case will provide a downstream-increasing torque and tension component. Thus, the components of rotor torque do both to compression and rub are maximum at the last/downstreammost/rear/aft stage and at any adjacent rear hub structure coupling the rotor stacks to the driving turbine section. The precompression force is, therefore, selected to provide sufficient at-speed compression to counter the operational tensions at the last stage and rear hub. Sufficient force must be maintained across a variety of speeds and operating conditions. For example, at given speeds, acceleration and deceleration may have largely opposite effects on loading relative to steady-state operation.

FIG. 1 shows a rear hub 70 coupling the HPC disks to the high speed shaft 31 and to the disks 72 of the HPT. Generally, the hub 70 includes a portion 74 extending forward and outward to be coupled to/engaged an associated/coupled one of the HPC disks (e.g., the last/rear disk).

Figure 2:
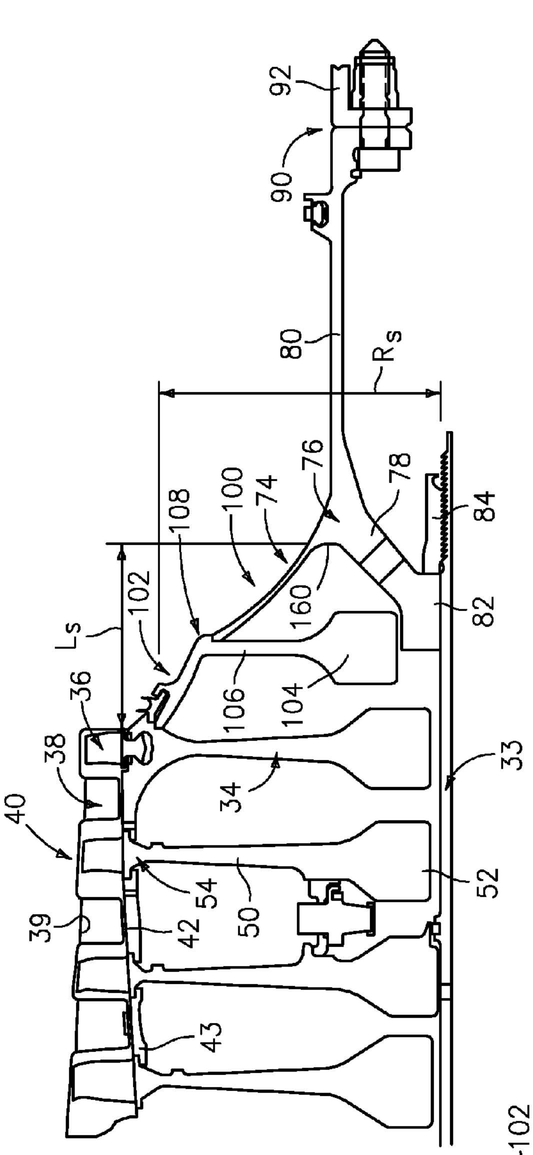
FIG. 2 is a partial longitudinal sectional view of a high pressure compressor rotor stack of the engine of FIG. 1.

FIG. 2 shows the portion 74 as extending forward and outward from a junction 76 with a portion 78 for connecting to the shaft and a portion 80 for connecting to the HPT. The exemplary portion 78 extends to an inner/ID region 82 which may engage the shaft radially and longitudinally. The exemplary region 82 is longitudinally retained to the shaft by a threaded nut 84 restricting relative rearward movement of the region 82. The engagement between the region 82 and the nut 84 allows transmission of compression through the stack and corresponding tension through the shaft forward portion 33. The exemplary portion 80 extends as a tube/shaft rearward to a junction 90 with a corresponding forward portion of a front/forward hub 92 of the HPT. The exemplary junction 90 is a flanged bolt circle.

FIG. 2 shows the portion 74 as including a proximal/aft/inboard portion (subportion) 100 and a distal/outboard/forward portion 102. The exemplary portion 74 carries a bore 104 via a web 106 extending inward from the junction 108 of the portions 100 and 102. The exemplary web 106 is unitarily formed with the distal portion 102. As is discussed further below, the proximal portion 100 has a greater half angle than the distal portion 102 (i.e., the portion 100 is more radial and the portion 102 is more longitudinal).

Figure 3:
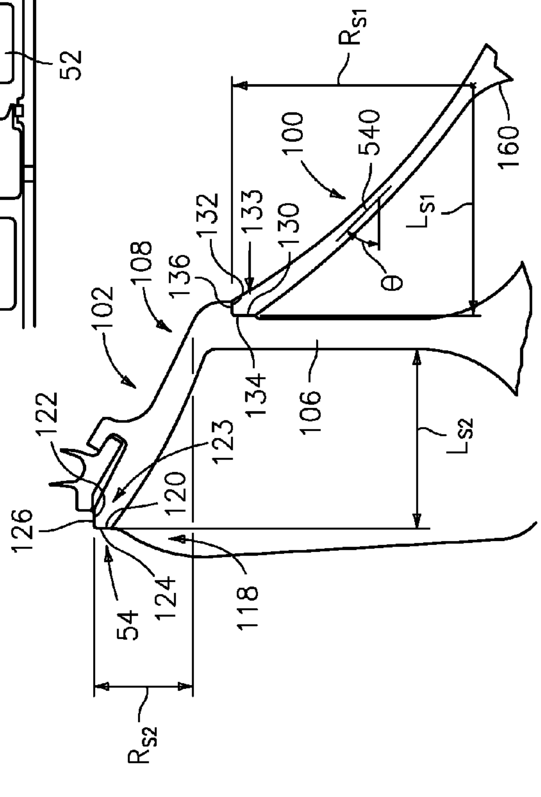
FIG. 3 is an enlarged view of an aft hub of the stack of FIG. 2.

FIG. 3 shows an exemplary junction 118 between the portion 74 and the rearmost disk 34. The outboard peripheral portion 54 of the rearmost disk 34 includes an inward and aft facing shoulder formed by an aft-facing surface 120 and an inward facing surface 122. A rim 123 of the hub distal portion 102 is accommodated within the shoulder. An exemplary front surface 124 of the rim engages the surface 120; an outer diameter (OD) surface 126 engages the surface 122. The exemplary junction 118 may similarly include a shoulder having surfaces 130 and 132 (on distal portion 102) and a rim 133 of the proximal portion 100 having a forward surface 134 and an OD surface 136.

Figure 4:
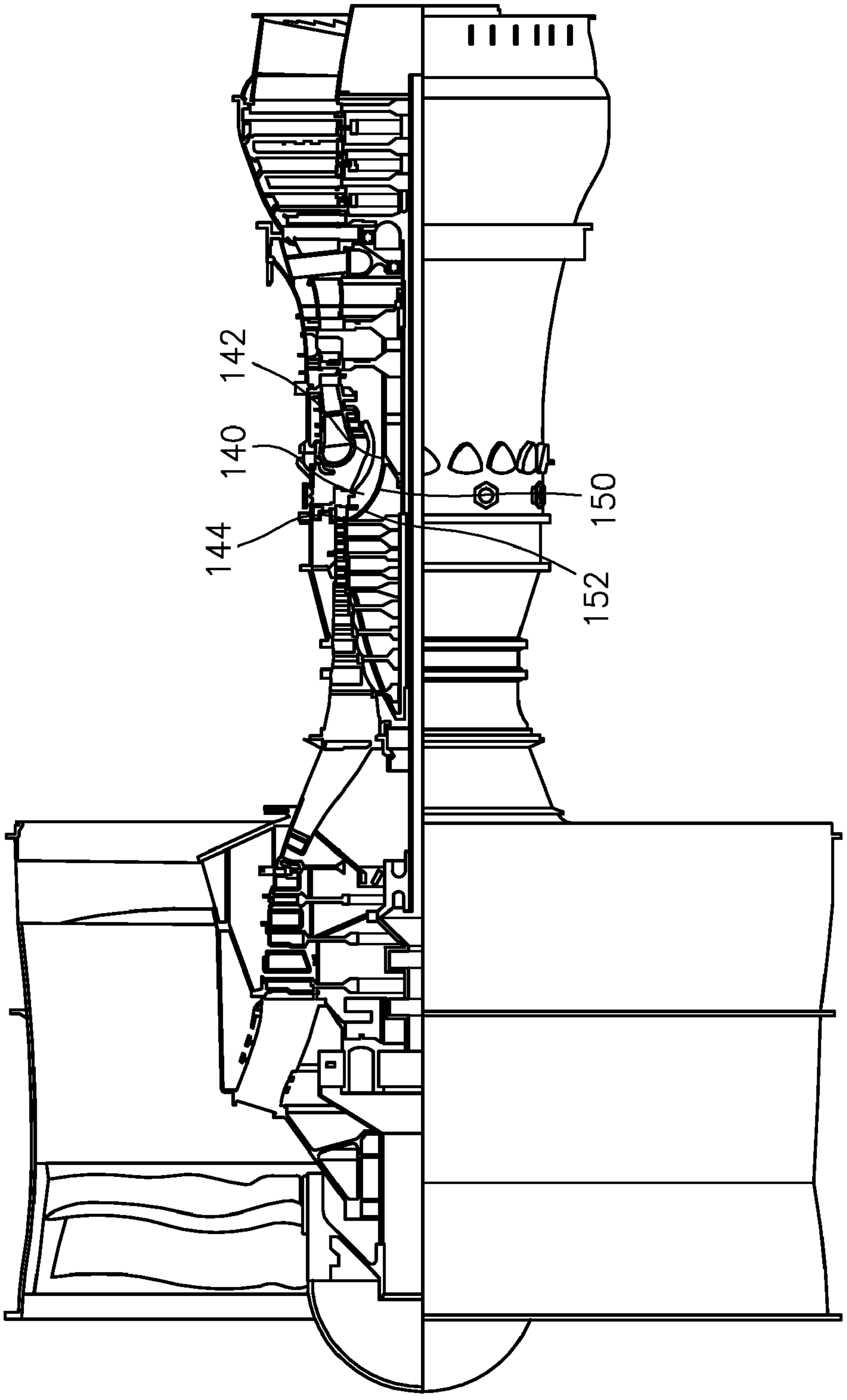
FIG. 4 (PRIOR ART)
FIG. 4 is a partial longitudinal sectional view of a prior art gas turbine engine.

FIG. 4 shows a prior art center-tie rotor stack which may serve as a baseline for reengineering to a configuration such as FIG. 1. The hub portion 140 extends forward and outward from a proximal root at a junction 142 to a distal rim 144. The rim 144 engages the aft-most disk. The engagement may be by one or more of a radial and/or axial interlocking or frictional interference fit. The hub portion 140 is outwardly concave along essentially its entire length so as to increase in slope or half angle from the junction 142 to the rim 144. Thus, a proximal portion 150 will be characterized by a smaller half angle than a distal portion 152. A boundary between the portions 150 and 152 may be somewhat arbitrarily defined. However, one convenient location would be a junction between separate pieces. Another convenient location would be a bore. Alternative prior art hubs are frustoconical as opposed to arcuate in section.

Figure 5:
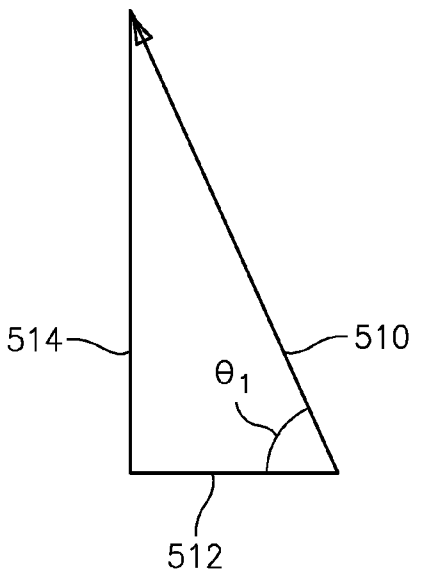
FIG. 5 (PRIOR ART)
FIG. 5 is a static force diagram for the aft hub of the compressor rotor stack of the engine of FIG. 4.

In a static condition (i.e., with the engine at zero speed) the hub may impart an axial compression force to the HPC stack. The hub may also impart an outward radial force creating a hoop tension in the aft-most disk. These engagement forces may be normalized such as in units of force per circumferential linear dimension, or units of force per angle about the engine centerline 502. FIG. 5 shows an exemplary diagram of the net normalized static force wherein the net force 510 has an axial component 512 and a radial component 514. The exemplary force vector 510 is off longitudinal/axial by an angle $\theta_1$. The vector 510 may be near parallel to a terminal slope of the distal section 152.

Figure 6:
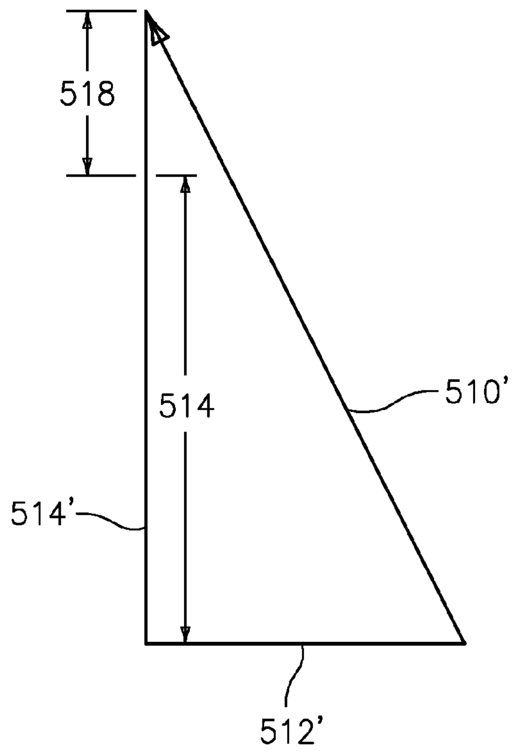
FIG. 6 (PRIOR ART)
FIG. 6 is an at-speed force diagram for the aft hub of the compressor rotor stack of the engine of FIG. 4.

Operational factors may tend to alter the net force with rotational speed. For example, the hub may tend to bow outward with increased speed. With a simple frustoconical hub, the art has known this bowing may have deleterious effects. Accordingly, the baseline hub includes an effective inward static bow provided by its outward concavity. Specifically, with a simple frustoconical hub, the induced outward bowing may tend to draw the forward rim of the hub rearward and decrease the engagement force with speed. With the FIG. 4 hub having a static inward bow, the straightening effect of the speed-imposed outward bow tends to shift the rim forward and increases the engagement force with speed. This helps maintain integrity of the stack during operation. For example, FIG. 6 shows an at-speed situation wherein the axial force has increased to 512' and the radial force has increased to 514' for an overall force of 510'.

Contrary to conventional wisdom, the rotor of FIG. 1 has a configuration resembling an overall outward bow. Specifically, the slope or half angle of the distal portion 102 (FIG. 2) is lower/smaller than that of the proximal portion 100. Although the individual portions 100 and 102 are shown concave outward, other variations are possible and are discussed below. For example, FIG. 2 shows the hub 74 as having a total radial span $R_S$ that includes the portions 78 and 82. Exemplary hub longitudinal span $L_S$ is defined only for the portion 74 and may extend from the base 160 of a channel formed by the forward surface of the junction 76. An exemplary longitudinal span $L_{S1}$ of the portion 100 may be measured from the base 160/forward surface of the junction 76 to the rim surface 134. The longitudinal span $L_{S2}$ of the portion 102 may be measured from the front surface of the web 106 to the rim surface 124. The radial span $R_{S1}$ of the portion 100 may be measured from a center of the section of the portion 100 at the same longitudinal position as the base 160 to the OD surface 136. Similarly, the radial span $R_{S2}$ of the portion 102 may be measured from a center of the section of the portion 102 at the front face of the web 106. Exemplary $L_{S1}$ and $L_{S2}$ are at least each 25% of $L_S$, more narrowly, 30%. Exemplary half angle θ may be measured relative to a median 540 of the section of the respective portions 100 or 102. The overall half angle of the portions may be measured as a mean or a median (e.g., averaged over length). Exemplary mean or median half angles of the distal portion 102 are at least 10% less than of the proximal portion 100. Exemplary mean or median half angles of the distal portion 102 are 0-40°, more narrowly, 20-40°. Exemplary terminal portions of the half angles (e.g., along terminal regions adjacent the rim 123) may be in a similar angle range. In the FIG. 3 embodiment, exemplary portions 100 and 102 are, both, over majorities of their respective lengths or longitudinal spans, concave outward. In alternative examples discussed below, one of the two (e.g., the distal portion 102) may alternatively be concave inward.

Figure 7:
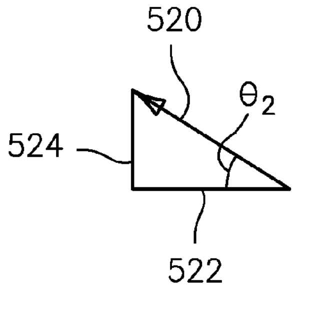
FIG. 7 is a static force diagram for the aft hub of the compressor rotor stack of the engine of FIG. 1.
Figure 8:
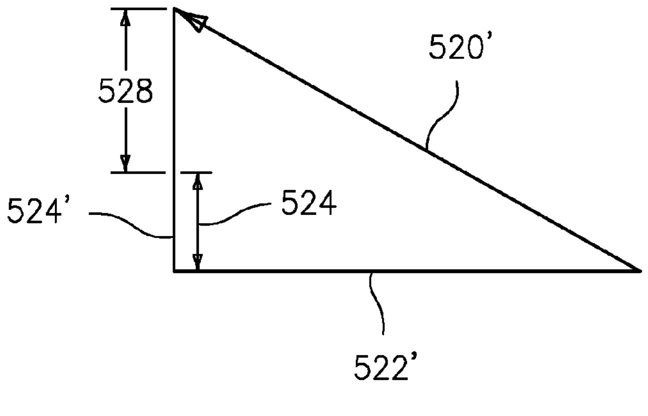
FIG. 8 is an at-speed force diagram for the aft hub of the compressor rotor stack of the engine of FIG. 1.

FIG. 7 is a static force diagram for the engine of FIG. 1. FIG. 8 is an at-speed force diagram. Exemplary operational speeds are 10,000-24,000 revolutions per minute (RPM), more narrowly, 17,500-21,500 RPM. A reengineering to such a configuration may provide greater control over the static relationship and speed-dependent relationship between axial and radial loads. For example, the configuration of the distal portion 102 may be selected to reduce at-speed radial loading. This may be achieved by reducing local slope or half angle at the junction 118. It also may be achieved by reduced outward concavity, increased thickness, or other engineering factors. The proximal portion 100 may, however, be configured to be primarily responsible for the speed-increasing axial load. Whereas the axial load will be transmitted through both portions 100 and 102, the radial load may be interrupted. For example, the provision of the bore 104 and web 106 can resist transmission of high radial loads at the junction 108 from being passed to the junction 118.

In the exemplary reengineering, one possible attribute is a reduction in the axial precompression force 522 (FIG. 7) relative to the prior art axial precompression 512. This may be accomplished along with a reduction in the static radial force 524 and net force 520. The reengineering may provide a reduction in the at-speed radial force 524' relative to the baseline force 514'. This reduction may advantageously be accompanied at least by a proportionately smaller reduction in the axial force 522' relative to the at-speed axial force 512'. However, the axial force may advantageously be either essentially maintained or even increased (e.g., as shown in FIG. 8). A reduction in the at-speed radial force (524' being reduced relative to 514') may allow for reduced strength and mass of the last disk (e.g., reducing its web thickness, bore size, etc.). The exemplary reengineering essentially maintains a speed-induced component 528 of the at-speed radial force relative to the baseline speed-induced component 518. In the exemplary reengineering, the baseline hub has both static and at-speed radial forces (e.g., force per linear circumferential dimension) greater than the associated longitudinal forces. In distinction, the reengineered hub has both static and at-speed longitudinal forces greater than the associated radial forces. More narrowly, the longitudinal forces may be at least 120% or 150% of the radial forces, yet more narrowly 150-500%. For the at-speed forces, these relationships may be present across the entireties of the operational speed range (e.g., the ranges identified above) or may be present at least at a single operational speed in such ranges.

The foregoing principles may be applied in the reengineering of an existing engine configuration or in an original engineering process. Various engineering techniques may be utilized. These may include computer simulations and actual hardware testing. The simulations/testing may be performed at static conditions and one or more non-zero speed conditions. The non-zero speed conditions may include one or both of steady-state operation and transient conditions (e.g., accelerations, decelerations, and combinations thereof). The simulation/tests may be performed iteratively. The iteration may involve varying parameters of the location of the junction 108, shape and thicknesses of the portions 100 and 102, attributes of the bore and web 104 and 106 and attributes of the last disk. Such a reengineering may change one or more additional attributes of the engine (beyond the preload and at-speed load values and relationships). For example, reduction in preload may allow reduction in weight or use of lighter or lower cost/performance materials elsewhere in the stack (e.g., relatively forward). This may be the case even where hub mass and/or the cost/performance of hub materials are increased. Additional changes may occur relatively downstream/aft in the stack. For example, reduction in the parasitic radial load on the last disk may reduce the needed strength of the last disk and thus reduce the massiveness of its bore, web, and rim. Such reductions may improve rotor thermal response and reduce stress-causing thermal gradients, yet further increasing performance envelope. Bore size reduction may permit a slight further reduction in engine length.

Figure 9:
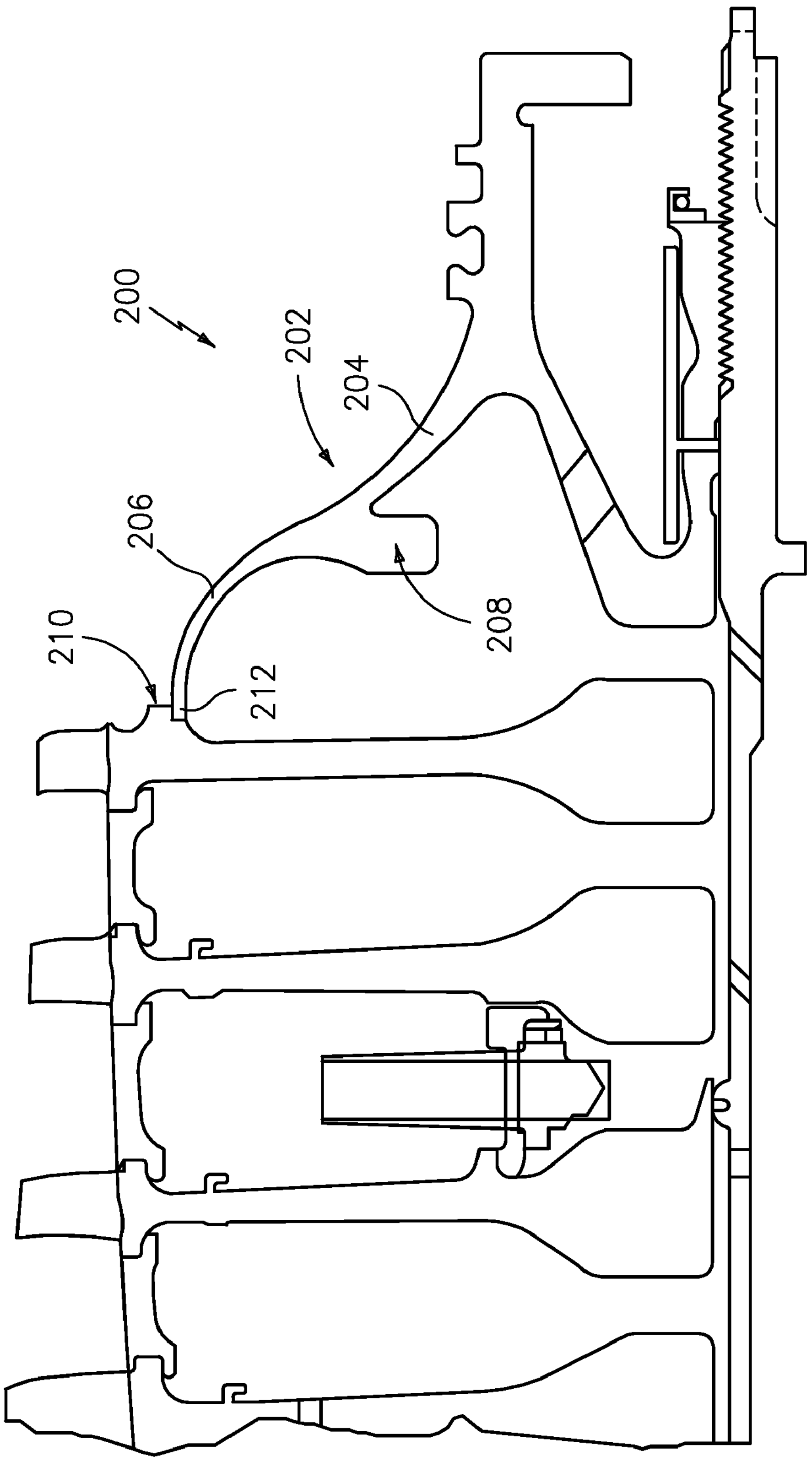
FIG. 9 is a partial longitudinal sectional view of an alternate high pressure compressor rotor stack.

FIG. 9 shows an alternate reengineered hub 200 wherein the forward and outward extending portion 202 is divided into a generally outwardly (relative to the centerline) concave proximal portion 204 and a generally outwardly convex distal portion 206. A webless bore 208 is formed proximate a junction between the proximal and distal portions. The outward convexity allows the exemplary distal portion 206 to be nearly longitudinal in the vicinity of a junction 210 of its rim 212 and the last disk. Relative to the concave distal portion 102, the convex distal portion 106 may reduce the relative radial load to axial load for the junction 210 versus the junction 118. This may reduce the needed strength/size/mass of the bore and web of the mating downstreammost/aftmost disk 34. This may simultaneously or alternatively increase the available operating speed. In such an embodiment, an overall (e.g., mean or median) half angle of the convex distal portion may be relatively high compared with a relatively low terminal angle in a region near the junction 210. For example, the overall angle may be in a range of 30-60° whereas the terminal angle may be in a range of 0-20°. Similarly, an average angle over a forward half of the distal portion 206 may be in a range of 5-30°.

Figure 10:
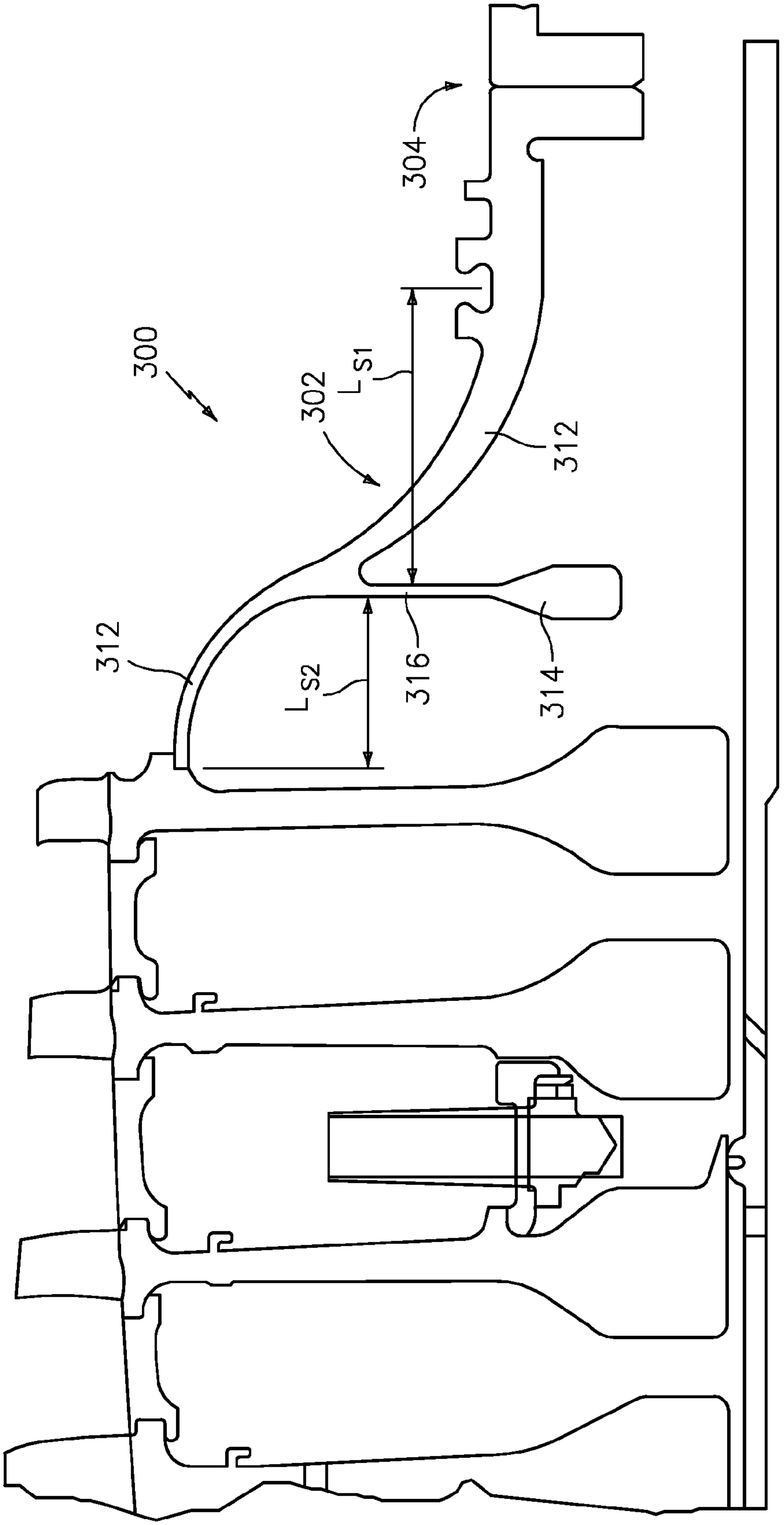
FIG. 10 is a partial longitudinal sectional view of a second alternate high pressure compressor rotor stack.

FIG. 10 shows yet an alternative hub 300 having a portion 302 connecting to the stack but lacking a portion connecting directly to the shaft. Rather, the hub extends rearward to a junction 304 with the HPT hub. Accordingly, a combined compression is applied across the HPC and HPT stacks and associated with a continuous tension along the high speed shaft (e.g., as opposed to a tension interrupted by the missing junction between the hub 302 and shaft. The shaft portion 302 has a proximal portion 310 and a distal portion 312 which may be otherwise similar to those of the hub 200. However, the absence of a portion connecting with the shaft allows the bore 314 to be relatively radially inward with a web 316 extending to the portion 302.

Figure 11:
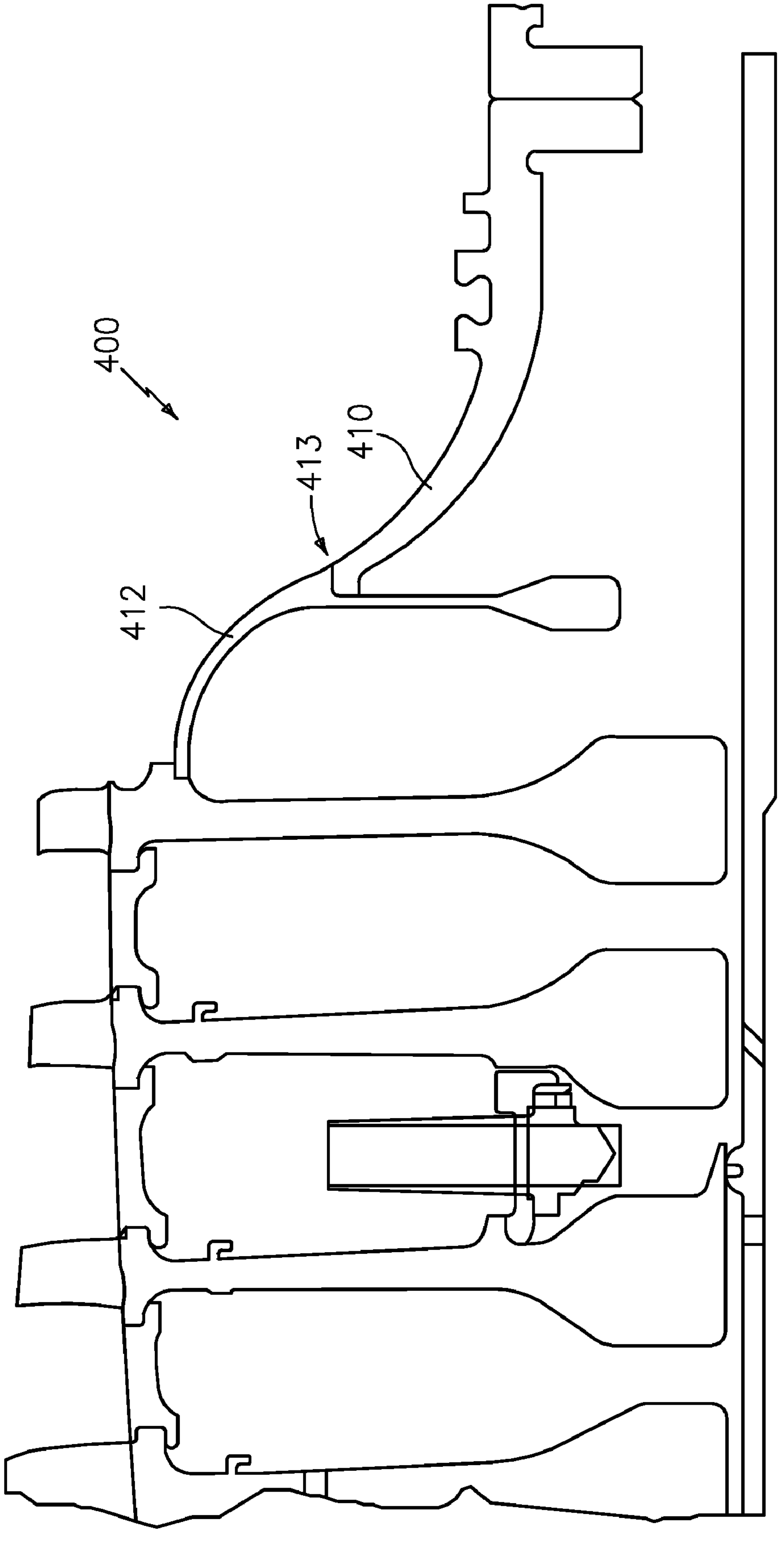
FIG. 11 is a partial longitudinal sectional view of a third alternate high pressure compressor rotor stack.

FIG. 11 shows a hub 400 otherwise similar to the hub 300 but with the proximal portion 410 and distal portion 412 formed as separate pieces with a similar rim-and-shoulder junction 413 to that of the FIG. 2 embodiment.

Figure 12:
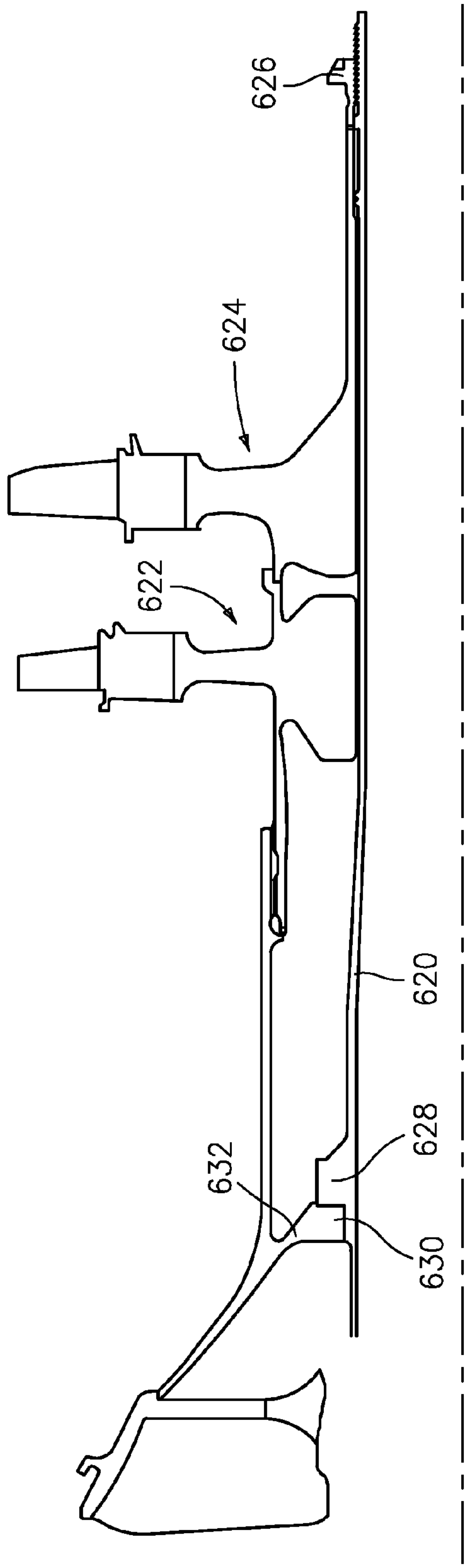
FIG. 12 is a partial longitudinal sectional view of an alternate high speed spool.

FIG. 12 shows an alternative high speed spool which, except, as described below, may be similar to that of FIG. 2. The high speed shaft 620 extends further aft than the shaft 33 of FIG. 2 to pass within the bores of disks 622 and 624 of the high pressure turbine (HPT) section. A nut 626 replaces the nut 84 and is positioned aft of the (HPT) disks. In the illustrated embodiment, forward of the (HPT) the shaft 620 includes a stop 628 which has a forward face abutting a rear face of an HPC hub ID region 630 (replacing the region 82). The exemplary region 630 is at the terminus of a rearwardly inwardly converging portion 632 replacing the portion 78 of FIG. 2.

Other single- and multi-spool configurations are possible. The hub features may be implemented in various such configurations and on various such spools. For example, implementation on an LPC hub (e.g., in a two- or three-spool configuration) may involve exemplary operating speeds in the range of 2,500-11,000 RPM.

One or more embodiments have been described. Nevertheless, it will be understood that various modifications may be made. For example, when applied as a reengineering of an existing engine configuration, details of the existing configuration may influence details of any particular implementation. Accordingly, other embodiments are within the scope of the following claims.

What is claimed is:

1. A gas turbine engine rotor comprising:
a central shaft having a central longitudinal axis;
a longitudinal stack of a plurality of disks surrounding the shaft; and
an aft hub coupling the stack to the shaft and comprising:
a proximal portion; and
a distal portion, the distal portion tapering at a lower characteristic half angle than the proximal portion, the distal portion and the proximal portion each accounting for at least 25% of a longitudinal span of a forward and outward diverging portion of the hub, the proximal portion being, along a majority of its length in longitudinal section, concave outward.

2. The rotor of claim 1 wherein:
the longitudinal stack of a plurality of disks is a compressor stack;
the rotor further comprises a turbine stack; and
the aft hub couples the compressor stack to the shaft via the turbine stack.

3. The rotor of claim 1 wherein each of the disks carries an associated stage of blades.

4. The rotor of claim 1 wherein:
the distal portion is, along a majority of its length, concave inward.

5. The rotor of claim 1 wherein:
the proximal portion half angle is a mean half angle;
the distal portion half angle is a mean half angle; and
the distal portion half angle is at least 10° less than the proximal portion half angle.

6. The rotor of claim 1 wherein the hub further comprises a bore.

7. The rotor of claim 6 wherein the bore is proximate a junction of the proximal and distal portions.

8. The rotor of claim 6 wherein:
the bore and the distal portion are formed as a first piece; and
the proximal portion is formed as a second piece.

9. The rotor of claim 8 wherein:
a distal end of the proximal portion is friction fit to a proximal end of the distal portion; and
a distal end of the distal portion is friction fit to an engaged one of the disks.

10. The rotor of claim 8 wherein:
a load path from the shaft extends rearwardly and outwardly through a connecting portion of the hub to the proximal portion and then forward and outward through the proximal portion to the distal portion, with an inner region of the connecting portion retained to the shaft to restrict relative rearward movement of the region so as to allow transmission of compression through the stack and tension through the shaft.

11. The rotor of claim 1 wherein the hub further comprises a forwardly convergent portion extending from an aft junction with the proximal portion.

12. The rotor of claim 1 wherein the hub engages a coupled one of the disks with a static longitudinal force and a static radial force.

13. The rotor of claim 12 wherein the proximal and distal portions are shaped so that the hub transfers an operational longitudinal force and operational radial force to the coupled disk at an operational speed of at least one speed in a range of 10,000-24,000 RPM, the longitudinal force is greater than the radial force per circumferential linear dimension.

14. The rotor of claim 12 wherein the proximal and distal portions are shaped so that the hub transfers an operational longitudinal force and operational radial force to the coupled disk at an operational speed of at least one speed in a range of 2,500-11,000 RPM, the longitudinal force is greater than the radial force per circumferential linear dimension.

15. A method for engineering the rotor of claim 12 comprising:
selecting relative geometry of the proximal portion and distal portion to provide said static longitudinal force and static radial force and a desired at-speed longitudinal force and at-speed longitudinal force and at-speed radial force.

16. The method of claim 15 wherein:

the engineering is a reengineering from a baseline configuration; and relative to the baseline configuration, there is a reduced axial pre-compression.

17. The method of claim 16 wherein:

the baseline configuration has a hub comprising:

a proximal portion; and a distal portion, the distal portion tapering at a greater characteristic half angle than the proximal portion, the distal and proximal portions each accounting for at least 25% of a longitudinal span of the hub.

18. The method of claim 16 wherein:

the baseline configuration has a bore-less hub.

19. A turbine engine comprising:

a fan;

a low speed compressor section downstream of the fan along a core flowpath;

a high speed compressor section downstream of the low speed compressor section along the core flowpath;

a combustor downstream of the high speed compressor section along the core flowpath;

a high speed turbine section downstream of the combustor along the core flowpath and driving the high speed compressor section; and a low speed turbine section downstream of the high speed turbine section along the core flowpath and driving the low speed compressor section and fan, wherein:

the high speed compressor section includes the rotor of claim 1.

20. A gas turbine engine rotor comprising:

a central shaft having a central longitudinal axis;

a longitudinal stack of a plurality of disks surrounding the shaft; and an aft hub coupling the stack to the shaft and comprising:

a proximal portion, along a majority of its length, concave outward; and a distal portion, along a majority of its length, concave inward, the distal portion and the proximal portion each accounting for at least 25% of a longitudinal span of a forward and outward diverging portion of the hub.

21. The rotor of claim 20 wherein each of the disks carries an associated stage of blades.

22. The rotor of claim 20 wherein:

the proximal portion is of a first piece; and the distal portion is of a second piece in friction fit with the first piece.

23. A method for reengineering a turbine engine rotor from a baseline configuration to a reengineered configuration, in the reengineered configuration, the rotor comprising:

a central shaft having a central longitudinal axis;

a longitudinal stack of a plurality of disks surrounding the shaft; and an aft hub coupling the stack to the shaft and comprising:

a proximal portion; and a distal portion, the distal portion tapering at a lower characteristic half angle than the proximal portion, wherein the hub engages a coupled one of the disks with a static longitudinal force and a static radial force, the method comprising:

selecting relative geometry of the proximal portion and distal portion to provide said static longitudinal force and static radial force and a desired at-speed longitudinal force and at-speed longitudinal force and at-speed radial force, wherein relative to the baseline configuration there is reduced axial precompression.

24. The method of claim 23 wherein:

the baseline configuration has a hub comprising:

a proximal portion; and a distal portion, the distal portion tapering at a greater characteristic half angle than the proximal portion, the distal and proximal portions each accounting for at least 25% of a longitudinal span of the hub.

25. The method of claim 23 wherein:

the baseline configuration has a bore-less hub.

26. A gas turbine engine rotor comprising:

a central shaft having a central longitudinal axis;

a longitudinal stack of a plurality of disks surrounding the shaft; and an aft hub coupling the stack to the shaft and comprising:

a proximal portion; and a distal portion, the distal portion tapering at a lower characteristic half angle than the proximal portion, wherein:

the hub engages a coupled one of the disks with a static longitudinal force and a static radial force; and the proximal and distal portions are shaped so that the hub transfers an operational longitudinal force and operational radial force to the coupled disk at an operational speed of at least one speed in a range of 10,000-24,000 RPM, the longitudinal force is greater than the radial force per circumferential linear dimension.

27. A gas turbine engine rotor comprising:

a central shaft having a central longitudinal axis;

a longitudinal stack of a plurality of disks surrounding the shaft; and an aft hub coupling the stack to the shaft and comprising:

a proximal portion; and a distal portion, the distal portion tapering at a lower characteristic half angle than the proximal portion, wherein:

the hub engages a coupled one of the disks with a static longitudinal force and a static radial force; and the proximal and distal portions are shaped so that the hub transfers an operational longitudinal force and operational radial force to the coupled disk at an operational speed of at least one speed in a range of 2,500-11,000 RPM, the longitudinal force is greater than the radial force per circumferential linear dimension.

* * * * *